US010249179B2

United States Patent

(12) Sun et al.

(10) Patent No.: US 10,249,179 B2

(45) Date of Patent: Apr. 2, 2019

(54) METHOD AND DEVICE FOR TRANSMITTING CONTROL SIGNAL OF MULTI-DEVICE SYSTEM

(71) Applicant: HISENSE BROADBAND MULTIMEDIA TECHNOLOGIES CO., LTD., Qingdao (CN)

(72) Inventors: Shoujun Sun, Qingdao (CN); Peishu Li, Qingdao (CN); Changzhen Guo, Qingdao (CN); Chaoqun Yu, Qingdao (CN); Fushan Ma, Qingdao (CN)

(73) Assignee: HISENSE BROADBAND MULTIMEDIA TECHNOLOGIES CO., LTD., Qingdao (CN)

( * ) Notice: Subject to any disclaimer, the term of this patent is extended or adjusted under 35 U.S.C. 154(b) by 0 days.

(21) Appl. No.: 14/671,597

(22) Filed: Mar. 27, 2015

(65) Prior Publication Data

US 2015/0279203 A1 Oct. 1, 2015

(30) Foreign Application Priority Data

Mar. 27, 2014 (CN) .......................... 2014 1 0119685

(51) Int. Cl.
*G05B 11/01* (2006.01)
*G08C 17/02* (2006.01)

(52) U.S. Cl.
CPC ......... *G08C 17/02* (2013.01); *G08C 2201/92* (2013.01)

(58) Field of Classification Search
CPC ............................ G08C 17/02; G08C 2201/92
USPC ...................................................... 340/12.22
See application file for complete search history.

(56) References Cited

U.S. PATENT DOCUMENTS

| | | | | |
|---|---|---|---|---|
| 2005/0096753 A1* | 5/2005 | Arling | G05B 15/02 | 700/11 |
| 2005/0212979 A1* | 9/2005 | Morita | A63F 13/06 | 348/734 |
| 2010/0060506 A1* | 3/2010 | Maier | G08C 17/02 | 341/176 |
| 2012/0161928 A1* | 6/2012 | Cheng | G05B 15/02 | 340/6.1 |

FOREIGN PATENT DOCUMENTS

| | | |
|---|---|---|
| CN | 202907115 | 4/2013 |

* cited by examiner

*Primary Examiner* — Zhen Y Wu
(74) *Attorney, Agent, or Firm* — Gordon & Rees LLP

(57) ABSTRACT

Embodiments of the disclosure provide a method an device for transmitting a control signal in a multi-device system, where a first device determines a second device to be controlled by a remote controller of the first device to be connected with the first device; determines from a received signal a first value of the button for controlling the first device; determines a second value of the button, corresponding to the first value of the button, for controlling the second device; and transmits the second value of the button to the second device, so that the second device operates according to the received second value of the button, and with this technical solution, a multi-device system can be controlled by the remote controller of the single device without infrared learning by the first device to thereby simplify operations of the first device to control the other device.

12 Claims, 5 Drawing Sheets

METHOD AND DEVICE FOR TRANSMITTING CONTROL SIGNAL OF MULTI-DEVICE SYSTEM

CROSS-REFERENCE TO RELATED APPLICATION

This application claims the benefit and priority of Chinese Patent Application No. 201410119685.1 filed Mar. 27, 2014. The entire disclosure of the above application is incorporated herein by reference.

FIELD

The present disclosure relates to the field of control by a remote controller and particularly to a method and device for transmitting a control signal in a multi-device system.

BACKGROUND

This section provides background information related to the present disclosure which is not necessarily prior art.

At present, TV sets, set-top boxes and other customer electronic devices have been widely applied in home life and work, and code values of remote controllers of different manufactures and different forms of products are generally distinct from each other, so that each device is provided with a remote controller, and the related device can not be controlled remotely once the remote controller thereof fails or is lost, thus bringing numerous inconveniences to the life and the work. Although some remote controller is provided with a learning function, the learning function thereof is limited to infrared learning of only several buttons (e.g., Up, Down, Left and Right, P+P−V+V−, etc.,) in order to save the cost of the device, so that buttons alternative to each other are limited to those several buttons, and consequently one of the remote controllers can not be replaced with another as much as possible, and operations in a learning process are generally complicated.

Taking a multi-device system as an example, the multi-device system refers to a system including a plurality of devices (e.g., TV sets, set-top boxes, DVD players, multimedia boxes, etc.) connected together via a communication interface or over a network, and remote controllers of the plurality of devices (e.g., remote controllers of the TV sets, remote controllers of the set-top boxes, remote controllers of the DVD players, remote controllers of the multimedia boxes, etc.). The remote controllers of the plurality of devices can also be radio frequency intelligent remote controllers.

When the multi-device system is controlled using the remote controllers of the plurality of devices, the remote controllers of the devices can be provided with a learning function, that is, the remote controllers in the multi-device system can be replaced with each other through infrared learning of several buttons, but operations in a learning process are generally complicated.

In summary, a remote controller of a device currently has to firstly learn to control another device, thus complicating control on the other device.

SUMMARY

This section provides a general summary of the disclosure, and is not a comprehensive disclosure of its full scope or all of its features.

An embodiment of the disclosure provides a method for transmitting a control signal in a multi-device system including at least a first device and a second device connected with each other, the method including:

receiving, by a first device, a control signal transmitted by a remote controller of the first device, and determining a first value of the button, wherein the first value of the button is configured to control the first device and corresponding to the control signal;

determining, by the first device, a second value of the button, wherein the second value of the button is corresponding to the first value of the button, and configured to control the second device; and transmitting, by the first device, the second value of the button to the second device.

An embodiment of the disclosure provides a method for controlling a multi-device system, the method including:

receiving, by a second device, a second value of the button from a first device, wherein the second value of the button is determined by the first device from a first value of the button derived from a signal transmitted by a remote controller of the first device; and operating, by the second device, according to the received second value of the button.

An embodiment of the disclosure provides a first device in a multi-device system, the first device including a memory and one or more processors, wherein the memory stores therein computer readable program codes, and the one or more processors are configured to execute the computer readable program codes:

to receive a control signal transmitted by a remote controller of the first device, and to determine a first value of the button, wherein the first value of the button is configured to control the first device and corresponding to the control signal;

to determine a second value of the button, wherein the second value of the button is corresponding to the first value of the button, and configured to control a second device in the multi-device system, wherein the second device is connected with the first device; and to transmit the second value of the button to the second device.

An embodiment of the disclosure provides a second device in a multi-device system, the second device including a memory and one or more processors, wherein the memory stores therein computer readable program codes, and the one or more processors are configured to execute the computer readable program codes:

to receive a second value of the button from a first device, wherein the second value of the button is determined by the first device from a first value of the button derived from a signal transmitted by a remote controller of the first device; and to operate according to the received second value of the button.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

According to embodiments of the disclosure, a first device determines a second device to be controlled by a remote controller of the first device to be connected with the first device; the first device determines from a received signal a first value of the button for controlling the first device; the first device determines a second value of the button, corresponding to the first value of the button, for controlling the second device; and the first device transmits the second value of the button to the second device, so that the second device operates according to the received second value of the button, and with this technical solution, a multi-device system can be controlled by the remote controller of the single device without infrared learning by the first device to thereby simplify operations of the first device to control the other device.

In order to make the technical problem, the technical solution and the advantageous effect of the disclosure more apparent, the disclosure will be described below in further details with reference to the drawings and embodiments thereof. It shall be appreciated that the particular embodiments described here are merely intended to illustrate but not to limit the disclosure.

Figure 1:
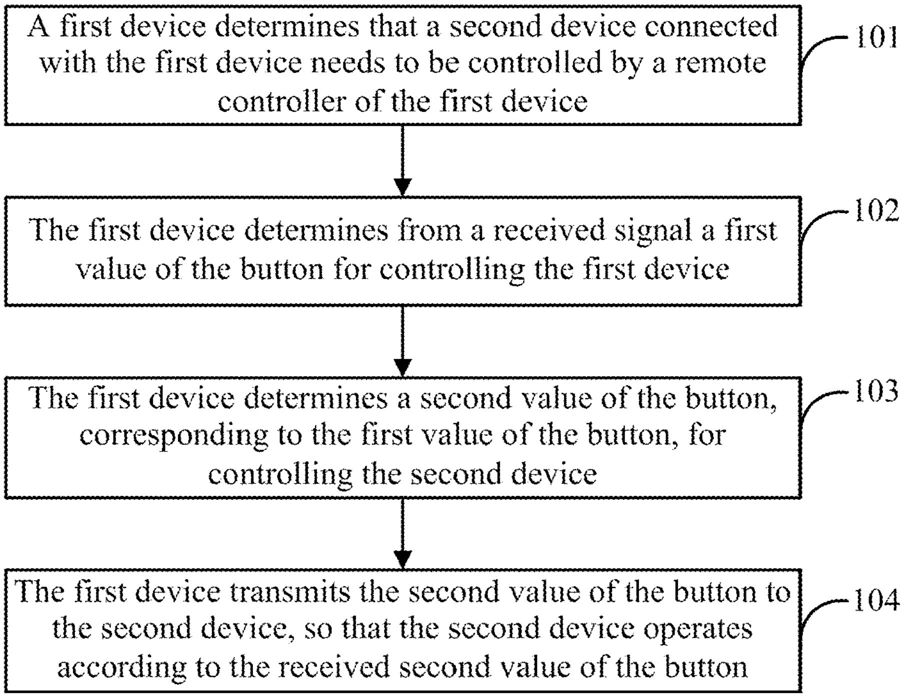
FIG. 1 illustrates a flow chart of a method for controlling a multi-device system according to an embodiment of the disclosure.

As illustrated in FIG. 1, a method for controlling a multi-device system according to a first embodiment of the disclosure includes:

In the operation 101, a first device determines that a second device connected with the first device needs to be controlled by a remote controller of the first device;

In the operation 102, the first device determines from a received signal a first value of the button for controlling the first device;

In the operation 103, the first device determines a second value of the button, corresponding to the first value of the button, for controlling the second device; and In the operation 104, the first device transmits the second value of the button to the second device, so that the second device operates according to the received second value of the button.

Optionally in the operation 101, the first device includes but will not be limited to one of an intelligent TV set, a network TV set, a liquid crystal display screen, etc.

Optionally in the operation 101, the second device includes but will not be limited to one of a set-top box, a DVD player, a multimedia box, etc.

Optionally the second device can be an external device connected with the first device.

Optionally the first device and the second device in the embodiment of the disclosure can be integrated in a combined TV set.

In an implementation, the signal received by the first device can be an infrared signal emitted by the remote controller of the first device; or can be a signal including the value of the button transmitted by the remote controller of the first device through WIFI.

Optionally in the operation 101, the first device determines that the second device connected with the first device needs to be controlled by the remote controller of the first device in the following approach:

The first device determines from the received signal that the second device connected with the first device needs to be controlled by the remote controller of the first device; or The first device determines that the second device connected with the first device needs to be controlled by the remote controller of the first device after a user chooses via a user interface to switch a remote controller.

It shall be noted that the approach above of the embodiment of the disclosure is merely exemplary, but the disclosure will not be limited thereto, and any other approach in which the first device can determine the second device to be controlled by the remote controller of the first device to be connected with the first device will be applicable to the embodiment of the disclosure.

In an implementation, the user can choose via the user interface to switch the remote controller when the remote controller needs to be switched (for example, when the remote controller of the second device can not operate normally).

The user can alternatively start a remote controller switching function using a customized combination of buttons (e.g., by pressing both the "Up" and "Down" buttons of the first remote controller) when the remote controller needs to be switched, so that the first devices determines the second device to be controlled by the remote controller of the first device to be connected with the first device.

Figure 2:
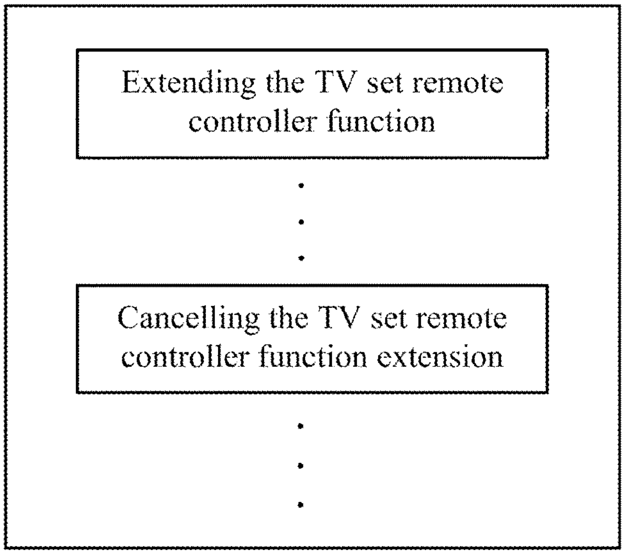
FIG. 2 illustrates a schematic diagram of a user interface on a remote controller of a first device in a multi-device system according to an embodiment of the disclosure.

The user choosing via the user interface to switch the remote controller will be described below as an example. For example, when a set-top box connected with a TV set needs to be controlled by a remote controller of the TV set, the user starts a user interface of the remote controller of the TV set, as illustrated in FIG. 2, using a combination of buttons (e.g., the volume "+" and "–" buttons) of the remote controller of the TV set (or the user can alternatively enter the user interface using a menu button) and selects a "Extending TV set remote controller function" in the user interface, so that the remote controller of the TV set issues a signal, and the TV set receives the signal of the remote controller of the TV set and thus determines that the set-top box connected with the TV set needs to be controlled by the remote controller of the TV set to be.

Optionally when the first device determines from the signal of the remote controller of the first device that the second device connected with the first device needs to be controlled by the remote controller of the first device, the first device will not operate upon reception of a control signal of the remote controller of the first device again, so that the first device determines from the first value of the button the second value of the button for controlling the second device and transmits the determined second value of the button to the second device.

For example when the TV set determines from the signal of the remote controller of the TV set that the set-top box connected with the TV set needs to be controlled by the remote controller of the TV set, the TV set will not operate upon reception of a control signal of the remote controller of the TV set again, so that the TV set determines from the first value of the button the second value of the button for controlling the set-top box and transmits the determined second value of the button to the set-top box, and thus the set-top box operate in response to the control signal of the remote controller of the TV set.

Optionally in the operation 102, the first device determines from the received signal the first value of the button for controlling the first device particularly as follows:

After the first device determines that the second device connected with the first device needs to be controlled by the remote controller of the first device, the user presses again a button on the remote controller of the first device, and then the remote controller of the first device transmits a control signal corresponding to the button, and the first device receives the control signal of the button transmitted by the remote controller of the first device and determines from the received control signal the first value of the button for controlling the first device.

For example, after the TV set determines that the set-top box connected with the TV set needs to be controlled by the remote controller of the TV set, the user presses again a button, e.g., the UP button, on the remote controller of the TV set, and the TV set receives a signal of the UP button transmitted by the remote controller of the TV set and determines from the receive signal of the UP button a value of the button corresponding to the UP button controlling the TV set (i.e., the UP button—0XD2), where the value of the button corresponding to the UP button for controlling the TV set is the first button (0XD2) in the first embodiment of the disclosure.

Optionally in the operation 103, the first device determines the second value of the button, corresponding to the first value of the button, for controlling the second device in a number of approaches, several ones of which will be listed below.

In a first approach, the first device determines the button corresponding to the first value of the button between a first correspondence relationship between the first value of the button and the button, and determines the second value of the button corresponding to the button corresponding to the first value of the button according to a second correspondence relationship between the second value of the button and the button.

Particularly the first correspondence relationship between the first value of the button and the button is a first correspondence relationship stored in the first device; and the second correspondence relationship between the second value of the button and the button is a second correspondence relationship stored in the second device.

For example if the first device is a TV set, and the second device is a set-top box, then the first correspondence relationship is a correspondence relationship between the first value of the button and the button of the TV set, e.g., the UP button—0XD2; and the second correspondence relationship is a correspondence relationship between the second value of the button and the button of the set-top box, e.g., the UP button—0XF1.

Particularly after the operation 102, the first device determines the button corresponding to the first value of the button according to the first correspondence relationship between the first value of the button and the button, and the first value of the button determined in the operation 102, and then determines the second value of the button corresponding to the button corresponding to the first value of the button according to the second correspondence relationship between the second value of the button and the button.

For example, after the TV set determines the first value of the button 0XD2 according to the first correspondence relationship between the first value of the button and the button of the TV set, the TV set can determine the UP button corresponding to the first value of the button 0XD2; and the TV set can determine the second value of the button 0XF1 corresponding to the UP button according to the second correspondence relationship between the second value of the button and the button of the set-top box.

Optionally both the first correspondence relationship between the first value of the button and the button, and the second correspondence relationship between the second value of the button and the button can be stored in the first device; or can be stored in another device readable by the first device, e.g., a mobile hard disk, etc.

In an implementation, the second correspondence relationship can be pre-stored in the first device. Since the first device connected with the second device may be changed later, there is such an optional approach in which:

The first device obtains the second correspondence relationship between the second value of the button and the button from the second device.

Figure 3:
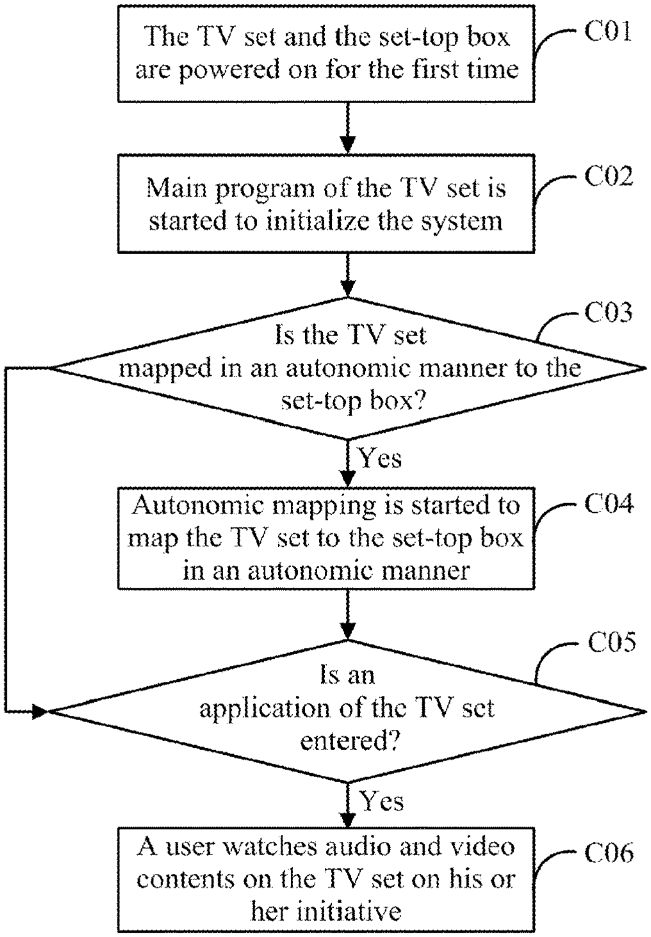
FIG. 3 illustrates a flow chart of autonomic mapping between a first device and a second device in a multi-device system according to an embodiment of the disclosure.

Particularly the first device obtains the second correspondence relationship between the second value of the button and the button from the second device in the following approach without any limitation thereto:

The first device obtains the second correspondence relationship between the second value of the button and the button from the second device via a communication interface to the second device; or the first device obtains the second correspondence relationship between the second value of the button and the button through WIFI. Reference can be made to FIG. 3 for a particular process thereof.

Optionally the first device obtains the second correspondence relationship between the second value of the button and the button from the second device particularly as follows:

When the first device and the second device are powered on, the first device is mapped in an autonomic manner to the second device via the communication interface, so that the first device obtains the second correspondence relationship between the second value of the button and the button of the second device; or When the second device is externally connected with the first device, the first device identifies model and ID parameters of the connected second device, and the first device obtains the second correspondence relationship between the second value of the button and the button of the second device from the second device; or When the user chooses via the user interface to switch the remote controller, the first device obtains the second correspondence relationship between the second value of the button and the button of the second device from the second device by selecting the "TV set function extended" on the user interface.

It shall be noted that the approaches above of the embodiment of the disclosure are merely exemplary, but the embodiment of the disclosure will not be limited thereto, and any other approach in which the first device can obtain the second correspondence relationship between the second value of the button and the button of the second device from the second device will be applicable to the embodiment of the disclosure.

In a particular implementation, if there are a plurality of second devices, then each second device is provided with its own correspondence relationship between a second value of the button and a button.

The first device selects one of the plurality of second devices in a number of approaches:

In a first approach, the first device selects one of the plurality of second devices according to setting by the user.

For example, the first device is a TV set, and the selectable second devices include a set-top box, a DVD player, a multimedia box, etc., and if the TV set is preset so that the TV set exchanges information with the set-top box by default, then the TV sets selects the set-top box as the second device by default.

In a second approach, the first device selects one selected by the user from the plurality of second devices.

For example, the first device is a TV set, and the selectable second devices include a set-top box, a DVD player, a multimedia box, etc., and one of the plurality of second devices is selected as needed by the user.

In a third approach, the first device selects one of the plurality of second devices, which is connected with the first device and operating.

For example, the first device is a TV set, and the selectable second devices include a set-top box, a DVD player, a multimedia box, etc., and if only the set-top box is connected with the TV set and operating among the plurality of second devices, then the TV set selects the set-top box from the selectable second devices as the second device.

After the first device selects one of the plurality of second devices, the first device determines the button corresponding to the first value of the button according to the first correspondence relationship between the first value of the button and the button of the first device, and determines the second value of the button corresponding to the button corresponding to the first value of the button according to the second correspondence relationship between the second value of the button and the button of the second device.

For example, if the first device is a TV set, and the user selects one of the plurality of second devices to be the set-top box, then:

The first correspondence relationship is the correspondence relationship between the first value of the button and the button of the TV set, e.g., the UP button—0XD2; and The second correspondence relationship is the correspondence relationship between the second value of the button and the button of the selected set-top box, e.g., the UP button—0XF1—the ID parameter of the selected set-top box.

After the TV set determines the first value of the button 0XD2 according to the first correspondence relationship between the first value of the button and the button of the TV set, the TV set can determine the UP button corresponding to the first value of the button 0XD2; and the TV set can determine the second value of the button 0XF1 corresponding to the UP button according to the second correspondence relationship between the second value of the button and the button of the set-top box.

Optionally when there are a plurality of selectable second devices, the first device obtains second correspondence relationships between second value of the buttons and buttons of the plurality of second devices according to ID parameters of the second devices.

Optionally when there are a plurality of selectable second devices, both the second correspondence relationships between the buttons and the corresponding second value of the buttons of the plurality of second devices, and the ID parameters of the plurality of second devices can be stored in the first device; or can be stored in another device readable by the first device, e.g., a mobile hard disk.

In a second approach, the first device determines the second value of the button corresponding to the first value of the button according to a third correspondence relationship between the first value of the button and the second value of the button.

In an implementation, the third correspondence relationship can be set directly in the first device. Since the second device connected with the first device may be changed later, there is such an optional approach in which:

The first device determines the third correspondence relationship from the first correspondence relationship and the second correspondence relationship.

Particularly the first correspondence relationship between the first value of the button and the button is a first correspondence relationship stored in the first device;

The second correspondence relationship between the second value of the button and the button is a second correspondence relationship stored in the second device; and The third correspondence relationship, between the first value of the button and the second value of the button, derived from the first correspondence relationship and the second correspondence relationship is a third correspondence relationship stored in the first device.

Particularly if the first device is a TV set, and the second device is a set-top box, then:

The first correspondence relationship is the correspondence relationship between the first value of the button and the button of the TV set, e.g., the UP button—0XD2;

The second correspondence relationship is the correspondence relationship between the second value of the button and the button of the set-top box, e.g., the UP button—0XF1; and The third correspondence relationship is a correspondence relationship, between the first value of the button of the TV set and the second value of the button of the set-top box, derived from the first correspondence relationship and the second correspondence relationship, e.g., 0XD2—the UP button—0XF1.

Particularly after the TV set determines the first value of the button 0XD2, the TV set can determine the second value of the button 0XF1 corresponding to the first value of the button 0XD2 directly according to the third correspondence relationship between the first value of the button 0XD2 and the second value of the button 0XF1.

Optionally the first correspondence relationship, the second correspondence relationship, and the third correspondence relationship, between the first value of the button and the second value, derived from the first correspondence relationship, and the second correspondence relationship of the second device can be stored in the first device; or can be stored in another device readable by the first device, e.g., a mobile hard disk, etc.

In an implementation, the second correspondence relationship can be pre-stored in the first device. Since the first device connected with the second device may be changed later, there is such an optional approach in which:

The first device obtains the second correspondence relationship between the second value of the button and the button from the second device.

Particularly the first device obtains the second correspondence relationship between the second value of the button and the button from the second device in the following approach without any limitation thereto:

The first device obtains the second correspondence relationship between the second value of the button and the button from the second device via a communication interface to the second device; or the first device obtains the second correspondence relationship between the second value of the button and the button through WIFI. Reference can be made to FIG. 3 for a particular process thereof.

Optionally the first device obtains the second correspondence relationship between the second value of the button and the button from the second device particularly as follows:

When the first device and the second device are powered on, the first device is mapped in an autonomic manner to the second device via the communication interface, so that the first device obtains the second correspondence relationship between the second value of the button and the button of the second device; or When the second device is externally connected with the first device, the first device identifies model and ID parameters of the connected second device, and the first device obtains the second correspondence relationship between the second value of the button and the button of the second device from the second device; or When the user chooses via the user interface to switch the remote controller, the first device obtains the second correspondence relationship between the second value of the button and the button of the second device from the second device by selecting the "TV set function extended" on the user interface.

It shall be noted that the approaches above of the embodiment of the disclosure are merely exemplary, but the embodiment of the disclosure will not be limited thereto, and any other approach in which the first device can obtain the second correspondence relationship between the second value of the button and the button of the second device from the second device will be applicable to the embodiment of the disclosure.

In correspondence to the first approach, in an implementation, if there are a plurality of selectable second devices, then each second device is provided with its own correspondence relationship between a button and a second value of the button, and the first device will select one of the plurality of second devices.

The first device can select one of the plurality of second devices as in the first approach above, so a repeated description thereof will be omitted here.

After the first device selects one of the plurality of second devices, the first device determines the second value of the button corresponding to the first value of the button according to the third correspondence relationship between the first value of the button and the second value of the button.

For example, if the first device is a TV set, and the user selects one of the plurality of second devices as the set-top box, then:

The first correspondence relationship is the correspondence relationship between the first value of the button and the button of the TV set, e.g., the UP button—0XD2;

The second correspondence relationship is the correspondence relationship between the second value of the button and the button of the selected set-top box, e.g., the UP button—0XF1—the ID parameter of the selected set-top box—the model of the set-top box; and The third correspondence relationship is the correspondence relationship, between the first value of the button of the TV set and the second value of the button of the set-top box, derived from the first correspondence relationship and the second correspondence relationship, e.g., 0XD2—the UP button—the ID parameter of the selected set-top box—the model of the set-top box—0XF1.

Particularly after the TV set determines the first value of the button 0XD2, the TV set can determine the UP button corresponding to the first value of the button 0XD2; and the TV set can determine the second value of the button 0XF1 corresponding to the first value of the button 0XD2 directly according to the third correspondence relationship between the first value of the button 0XD2 and the second value of the button 0XF1.

Optionally when there are a plurality of selectable second devices, all of the first correspondence relationship, the second correspondence relationship of the selected second device, the third correspondence relationship, between the first value of the button and the second value of the button, derived from the first correspondence relationship and the second correspondence relationship, and the model and ID parameters of the plurality of second devices can be stored in the first device; or can be stored in another device readable by the first device, e.g., a mobile hard disk, etc.

Optionally in the operation 104 of the embodiment of the disclosure, the first device transmits the second value of the button to the second device, so that the second device operates according to the received second value of the button, particularly as follows:

The first device transmits the second value of the button to the first device via a communication interface to the second device, so that the second device operates according to the second correspondence relationship, between the second value of the button and the button, stored in the second device.

For example, if a TV set is the first device, and a set-top-box is the second device, then the TV set transmits the second value of the button (0XF1) determined in the operation 103 to the set-top box via a communication interface to the TV set, so that the set-top box operates according to the received second value of the button.

Optionally in the embodiment of the disclosure, a one-button selection operation is started using a combination of buttons on the user interface of the remote controller of the first device to disable the remote controller of the first device from controlling the second device.

Particularly when the first device determines the second device not to be controlled by the remote controller of the first device, the user can start the user interface of the remote controller of the first device using a combination of buttons (e.g., the volume "+" and "−" buttons) (or the user interface can alternatively be entered using a menu button) and select a "Cancelling the first device remote controller function extension", and at this time the remote controller of the first device transmits a button signal corresponding to the "Cancelling the first device remote controller function extension disabled", and the first device determines from the received signal of the remote controller the remote controller of the first device to be disabled from controlling the second device. Thereafter the remote controller of the first device resumes control on the first device.

For example when the set-top box is determined not to be controlled by the remote controller of the TV set, the user can start the user interface of the remote controller of the TV set using a combination of buttons (e.g., the volume "+" and "−" buttons) (or the user interface can alternatively be entered using a menu button) and select the "Cancelling the TV set remote controller function extension", and at this time the remote controller of the TV set transmits a button signal corresponding to the "Cancelling the TV set remote controller function extension", and the TV set determines from the received signal of the remote controller the remote controller of the TV set to be disabled from controlling the set-top box. Thereafter the remote controller of the TV set resumes control on the TV set.

In the embodiment as illustrated in FIG. 3, if a TV set is the first device, and a set-top box is the second device, then the first device obtains the second correspondence relationship between the second value of the button and the button via the communication interface to the second device particularly in the following operations:

C01: The TV set and the set-top box are powered on;

C02: Main program of the TV set is started to initialize the system;

C03: It is judged whether the TV set is mapped in an autonomic manner to the set-top box, and if so, then the flow proceeds to the operation C04; otherwise, the flow proceeds to the operation C05;

C04: Autonomic mapping is started to map the TV set to the set-top box in an autonomic manner;

C05: Subsequent to the mapping, it is judged whether to start an application of the TV set, and if so, then the flow proceeds to the operation C06; and C06: The user watches audio and video contents on the TV set on his or her initiative.

Optionally in the operation C04, an autonomic mapping process is started particularly as follows:

The user starts the user interface of the remote controller of the TV set using a combination of buttons of the remote controller of the TV set (e.g., the volume "+" and "−" buttons) (or the user interface can alternatively be entered using a menu button), selects the "Extending the TV set remote controller function", and starts autonomic mapping between the TV set and the set-top box using a one-button selection operation.

Optionally in the operation C04, the TV set and the set-top box are mapped in an autonomic manner particularly as follows:

The TV set obtains the second correspondence relationship between the second value of the button of the set-top box and the button of the remote controller of the set-top box, and the model parameter of the set-top box and the ID parameter of the set-top box, and stores the second correspondence relationship, and the model and ID parameters of the set-top box after being mapped, in a memory of the TV set, so that when the user determines the set-top box to be controlled by the remote controller of the TV set, the UE can simply select the "Cancelling the TV set remote controller function extension" using a combination of buttons, so that the remote controller of the TV set can invoke the second correspondence relationship between the button and the corresponding value of the button of the remote controller of the set-top box in the memory of the TV set on its own initiative to control the set-top box.

Optionally the TV set and the set-top box map the second correspondence relationship to the model and ID parameters of the set-top box via the communication interface between them.

Optionally if the second correspondence relationship between the button and the corresponding value of the button of the remote controller of the set-top box, and the model parameter of the set-top box and the ID parameter of the set-top box are not stored in a memory of the set-top box, then the TV set directly searches a specific storage space of the memory of the set-top box for, copies, maps and stores in the memory of the TV set the second correspondence relationship between the button and the corresponding value of the button of the remote controller of the set-top box, and the model parameter of the set-top box and the ID parameter of the set-top box.

Optionally in the embodiment of the disclosure, the autonomic mapping process between the second device and the first device can be performed when they are powered on for the first time, and after the multi-device system is powered on, the second correspondence relationship, the model parameter and the device ID parameter of the second device stored in the second device can be obtained directly for the remote controller of the first device to control the second device.

Optionally in the embodiment of the disclosure, autonomic mapping between the first device and the second device can be performed anew as need by the user to obtain the latest second correspondence relationship, the model parameter and the device ID parameter of the second device.

Optionally in the embodiment of the disclosure, the first device can alternatively obtain the second correspondence relationship between the second value of the button and the button of the second device through WIFI.

For example, if the remote controller of the TV set is a radio frequency intelligent remote controller, then the TV set is mapped in an autonomic manner to the set-top box directly over a radio frequency channel without resorting to any physical interface and stores the second correspondence relationship between the button and the corresponding value of the button, the model parameter and the device ID parameter of the remote controller of the set-top box in the memory of the TV set.

Figure 4:
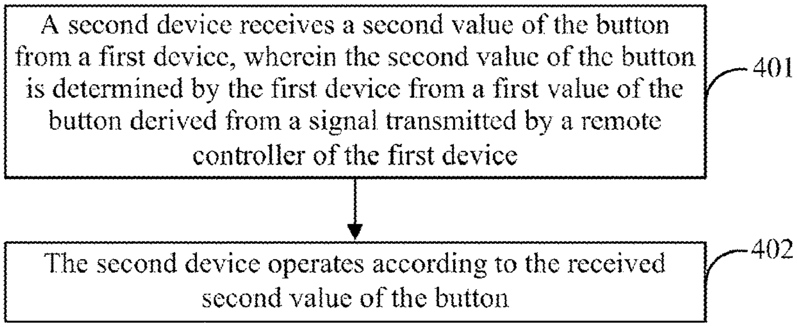
FIG. 4 illustrates a flow chart of a method for controlling a multi-device system according to an embodiment of the disclosure.

As illustrated in FIG. 4, a method for controlling a multi-device system according to an embodiment of the disclosure includes:

In the operation 401, a second device receives a second value of the button from a first device, where the second value of the button is determined by the first device from a first value of the button derived from a signal transmitted by a remote controller of the first device; and In the operation 402, the second device operates according to the received second value of the button.

Optionally the second device receives the second value of the button transmitted by the first device via a communication interface to the first device.

Optionally the second device operates according to the received second value of the button, and a second correspondence relationship, between the second button and a button, stored in the second device.

For example, if a TV set is the first device, and a set-top box is the second device, then the set-top box receives the second value of the button (0XF1) transmitted by the TV set via the communication interface to the TV set and operates according to the received second value of the button, and the second correspondence relationship, between the second value of the button (0XF1) and the button, stored in the set-top box.

For the flow of the method above, embodiments of the disclosure further provide a second device and a first device controlled in a multi-device system, and a system for controlling a plurality of devices, and reference can be made to the implementation of the method above for details of these devices and the system, so a repeated description thereof will be omitted here.

Optionally the first device and the second device in the embodiment of the disclosure can be integrated in a combined TV set.

Figure 5:
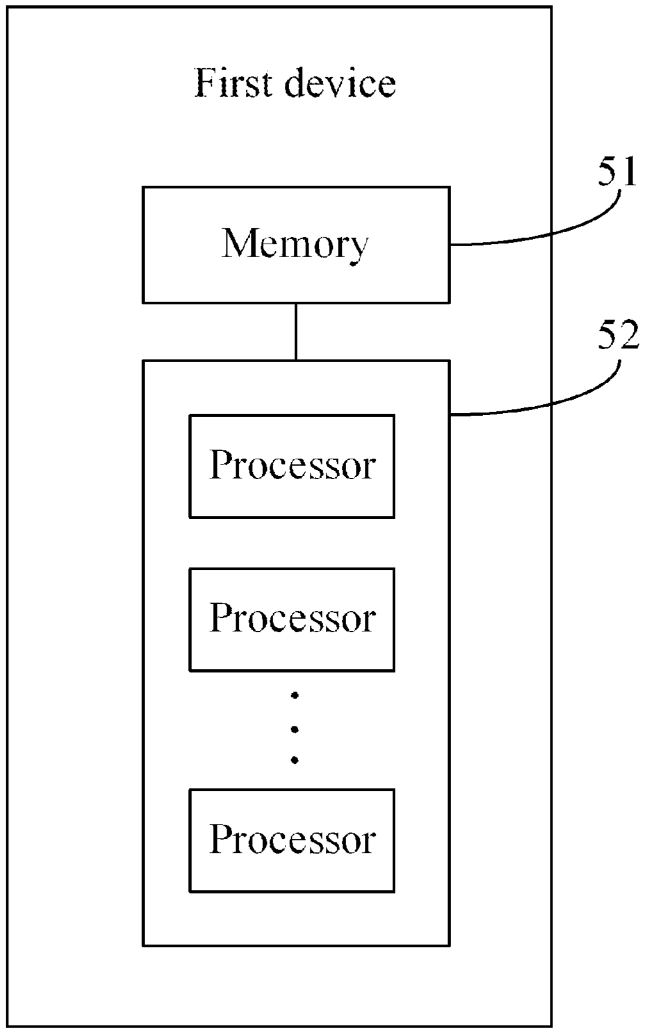
FIG. 5 illustrates a schematic structural diagram of a first device in a multi-device system according to an embodiment of the disclosure.

As illustrated in FIG. 5, an embodiment of the disclosure provides a first device in a multi-device system, and the first device includes a memory 51 and one or more processors 52, where the memory 51 stores therein computer readable program codes, and the one or more processors 52 are configured to execute the computer readable program codes:

To determine that a second device connected with the first device needs to be controlled by a remote controller of the first device; to determine from a received signal a first value of the button for controlling the first device; and to determine a second value of the button, corresponding to the first value of the button, for controlling the second device; and To transmit the second value of the button to the second device, so that the second device operates according to the received second value of the button.

Optionally the second device connected with the first device is determined to be controlled by the remote controller of the first device from the received signal; or The second device connected with the first device is determined to be controlled by the remote controller of the first device after a user chooses via a user interface to switch a remote controller.

Optionally the second value of the button, corresponding to the first value of the button, for controlling the second device is determined by determining a button corresponding to the first value of the button according to a first correspondence relationship between the first value of the button and the button and determining the second value of the button corresponding to the button corresponding to the first button according to a second correspondence relationship between the second value of the button and the button; or The second value of the button, corresponding to the first value of the button, for controlling the second device is determined by determining the second value of the button corresponding to the first value of the button according to a third correspondence relationship between the first value of the button and the second value of the button.

Optionally the second value of the button corresponding to the button corresponding to the first value of the button is determined according to the second correspondence relationship between the second value of the button and the button in such a way that if there are a plurality of second devices, then the first device selects one of the plurality of second devices and determines the second value of the button corresponding to the button corresponding to the first value of the button according to the second correspondence relationship of the selected second device.

Optionally the second value of the button corresponding to the first value of the button is determined according to the third correspondence relationship between the first value of the button and the second value of the button in such a way that if there are a plurality of second devices, then the first device selects one of the plurality of second devices and determines the second value of the button corresponding to the first value of the button according to the third correspondence relationship of the selected second device.

Optionally one of the plurality of second devices is selected by selecting one of the plurality of second devices according to setting by a user; or One of the plurality of second devices is selected by selecting one selected by a user from the plurality of second devices; or One of the plurality of second devices is selected by selecting one of the plurality of second devices, which is connected with the first device and operating.

Optionally before the second value of the button corresponding to the button corresponding to the first value of the button is determined according to the second correspondence relationship between the second value of the button and the button, the one or more processors 52 are further configured to execute the one or more computer readable program codes:

To obtain the second correspondence relationship from the second device.

Optionally the first device can determine the third correspondence relationship as follows:

The first device determines the third correspondence relationship from the first correspondence relationship and the second correspondence relationship.

Figure 6:
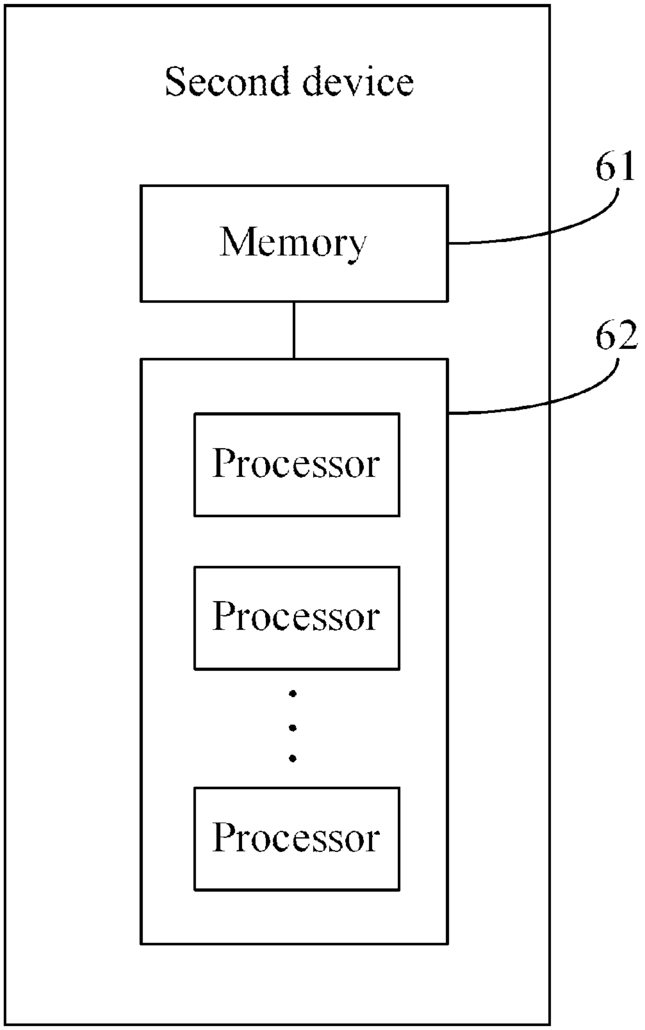
FIG. 6 illustrates a schematic structural diagram of a second device in a multi-device system according to an embodiment of the disclosure.

As illustrated in FIG. 6, an embodiment of the disclosure provides a first device in a multi-device system, and the first device includes a memory 61 and one or more processors 62, where the memory 61 stores therein computer readable program codes, and the one or more processors 62 are configured to execute the computer readable program codes:

To receive a second value of the button from a first device, where the second value of the button is determined by the first device from a first value of the button derived from a signal transmitted by a remote controller of the first device; and To operate according to the received second value of the button.

Figure 7:
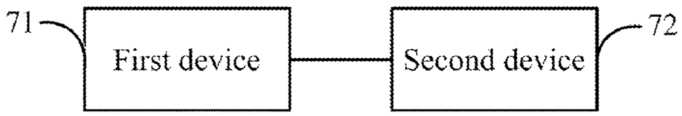
FIG. 7 illustrates a schematic structural diagram of a system for controlling a plurality of devices according to an embodiment of the disclosure.

As illustrated in FIG. 7, an embodiment of the disclosure provides a system for controlling a plurality of devices according to an embodiment of the disclosure, and the system includes:

A first device 71 is configured to determine a second device to be controlled by a remote controller of the first device to be connected with the first device; to determine from a received signal a first value of the button for controlling the first device; to determine a second value of the button, corresponding to the first value of the button, for controlling the second device; and to transmit the second value of the button to a second device, so that the second device operates according to the received second value of the button; and The second device 72 is configured to receive the second value of the button from the first device, where the second value of the button is determined by the first device from the first value of the button derived from the signal transmitted by the remote controller of the first device; and to operate according to the received second value of the button.

In an implementation, the signal received by the first device 71 can be an infrared signal emitted by the remote controller of the first device 71; or can be a signal including the value of the button transmitted by the remote controller of the first device 71 through WIFI.

Optionally the first device and the second device in the embodiment of the disclosure can be integrated in a combined TV set.

Figure 8:
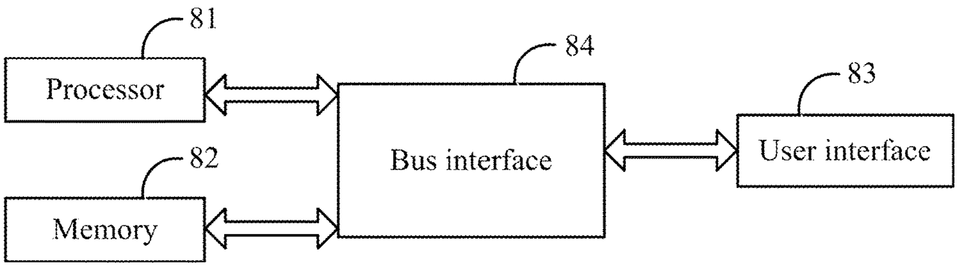
FIG. 8 illustrates a schematic structural diagram of a first device arranged in a multi-device system according to an embodiment of the disclosure.

As illustrated in FIG. 8, an embodiment of the disclosure provides a first device controlled in a multi-device system, and the first device includes a processor 81, a memory 82, a user interface 83 and a bus interface 84, where the processor 81, the memory 82 and the user interface 83 are connected via the bus interface 84.

The processor 81 is configured to determine a second device to be controlled by a remote controller of the first device to be connected with the first device; to determine from a received signal a first value of the button for controlling the first device; to determine a second value of the button, corresponding to the first value of the button, for controlling the second device; and to transmit the second value of the button to the second device, so that the second device operates according to the received second value of the button.

Optionally the processor 81 is configured:

To determine that the second device connected with the first device needs to be controlled by the remote controller of the first device by determining from the received signal the second device to be controlled by the remote controller of the first device to be connected with the first device; or To determine that the second device connected with the first device needs to be controlled by the remote controller of the first device by determining the second device to be controlled by the remote controller of the first device to be connected with the first device after a user chooses via a user interface to switch a remote controller.

Optionally the processor 81 is configured:

To determine the second value of the button, corresponding to the first value of the button, for controlling the second device by determining a button corresponding to the first value of the button according to a first correspondence relationship between the first value of the button and the button and determining the second value of the button corresponding to the button corresponding to the first button according to a second correspondence relationship between the second value of the button and the button; or To determine the second value of the button, corresponding to the first value of the button, for controlling the second device by determining the second value of the button corresponding to the first value of the button according to a third correspondence relationship between the first value of the button and the second value of the button.

Optionally the processor 81 is configured:

To determine the second value of the button corresponding to the button corresponding to the first value of the button is determined according to the second correspondence relationship between the second value of the button and the button in such a way that if there are a plurality of second devices, then the first device selects one of the plurality of second devices and determines the second value of the button corresponding to the button corresponding to the first value of the button according to the second correspondence relationship of the selected second device.

Optionally the processor 81 is configured:

To determine the second value of the button corresponding to the first value of the button according to the third correspondence relationship between the first value of the button and the second value of the button in such a way that if there are a plurality of second devices, then the first device selects one of the plurality of second devices and determines the second value of the button corresponding to the first value of the button according to the third correspondence relationship of the selected second device.

Optionally the processor 81 is configured:

To select one of the plurality of second devices by selecting one of the plurality of second devices according to setting by a user; or To select one of the plurality of second devices by selecting one selected by a user from the plurality of second devices; or To select one of the plurality of second devices by selecting one of the plurality of second devices, which is connected with the first device and operating.

Optionally the processor 81 is configured:

To obtain the second correspondence relationship from the second device before the second value of the button corresponding to the button corresponding to the first value of the button according to the second correspondence relationship between the second value of the button and the button.

Optionally the processor 81 configured to determine the third correspondence relationship is configured:

To determine the third correspondence relationship from the first correspondence relationship and the second correspondence relationship.

In the embodiment of the disclosure in FIG. 8, the bus architecture can include any number of interconnected buses and bridges and particularly link together one or more processors represented by the processor 81, one or more memories represented by the memory 82, and various other circuits. The bus architecture can further link together various other circuits, e.g., peripheral devices, a voltage stabilizer, a management circuit, etc., and all these circuits are well known in the art, so a further description thereof will be omitted in this context.

In the embodiment of the disclosure in FIG. 8, the bus interface 84 serves as an interface, and the bus interface 84 includes a communication interface for the first device to be connected with the second device, and the processor 81 is responsible for managing the bus architecture and performing normal processes. The memory 82 can store data used by the processor 81 to perform the operations. For different user devices, the user interface 83 can also be an interface connected with an internal or external device as needed, and the connected device can include but will not be limited to a keypad, a display, a speaker, a microphone, a joy stick, etc.

Figure 9:
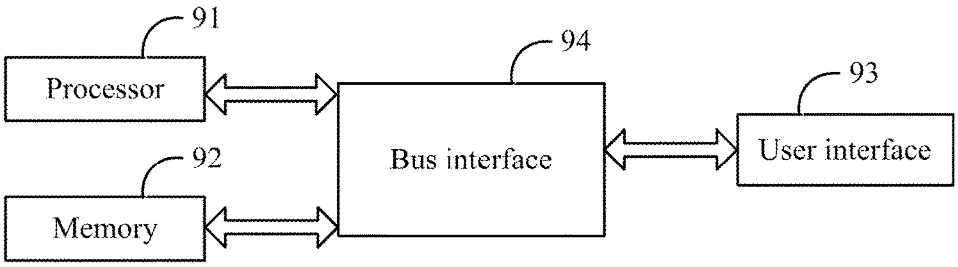
FIG. 9 illustrates a schematic structural diagram of a second device arranged in a multi-device system according to an embodiment of the disclosure.

As illustrated in FIG. 9, an embodiment of the disclosure provides a second device controlled in a multi-device system, and the second device includes a processor 91, a memory 92, a user interface 93 and a bus interface 94, where the processor 91, the memory 92 and the user interface 93 are connected via the bus interface 94.

The processor 91 is configured to receive a second value of the button from a first device, where the second value of the button is determined by the first device from a first value of the button derived from a signal transmitted by a remote controller of the first device; and to operate according to the received second value of the button.

In the embodiment of the disclosure in FIG. 9, the bus architecture can include any number of interconnected buses and bridges and particularly link together one or more processors represented by the processor 91, one or more memories represented by the memory 92, and various other circuits. The bus architecture can further link together various other circuits, e.g., peripheral devices, a voltage stabilizer, a management circuit, etc., and all these circuits are well known in the art, so a further description thereof will be omitted in this context.

In the embodiment of the disclosure in FIG. 9, the bus interface 94 serves as an interface, and the bus interface 94 includes a communication interface for the second device to be connected with the first device, and the processor 91 is responsible for managing the bus architecture and performing normal processes. The memory 92 can store data used by the processor 91 to perform the operations. For different user devices, the user interface 93 can also be an interface connected with an internal or external device as needed, and the connected device can include but will not be limited to a keypad, a display, a speaker, a microphone, a joy stick, etc.

Those skilled in the art shall appreciate that the embodiments of the disclosure can be embodied as a method, a system or a computer program product. Therefore the disclosure can be embodied in the form of an all-hardware embodiment, an all-software embodiment or an embodiment of software and hardware in combination. Furthermore the disclosure can be embodied in the form of a computer program product embodied in one or more computer useable storage mediums (including but not limited to a disk memory, a CD-ROM, an optical memory, etc.) in which computer useable program codes are contained.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the disclosure have been described, those skilled in the art benefiting from the underlying inventive concept can make additional modifications and variations to these embodiments. Therefore the appended claims are intended to be construed as encompassing the preferred embodiments and all the modifications and variations coming into the scope of the disclosure.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method for transmitting a signal in a multi-device system comprising at least a first electronic device and a second electronic device connected with each other, wherein the first electronic device is a television set and the second electronic device is a set-top box, each of the first electronic device and the second electronic device including a memory and one or more processors, each memory storing computer readable codes and the one or more processors configured to execute the computer readable codes, the method comprising:

receiving, by a first electronic device, a control signal transmitted by a remote controller of the first electronic device;

determining , by the first electronic device, a first button value corresponding to the control signal, wherein the first button value is a first instruction code configured to control the first electronic device to perform a first defined operation;

when determining, by the first electronic device, that the second electronic device connected with the first electronic device is to be controlled by the remote controller of the first electronic device, then instead of performing the first defined operation;

determining, by the first electronic device, a button of the remote controller corresponding to the first button value;

determining, by the first electronic device, a second button value corresponding to the determined button according to a second correspondence relationship between the determined button and the second button value, wherein the second button value is a second instruction code configured to control the second electronic device to perform a second defined operation indicated by the second instruction code, wherein the second correspondence relationship is obtained by the first electronic device from the second electronic device, and wherein the second button value is different from the first button value; and transmitting, by the first electronic device, the second button value to the second electronic device.

2. The method of claim 1, wherein determining, by the first electronic device, the second button value corresponding to the determined button according to the second correspondence relationship between the second button value and the determined button comprises: when the multi-device system comprises a plurality of second electronic devices, selecting by the first electronic device, one of the plurality of second electronic devices and determining the second button value corresponding to the determined button according to the second correspondence relationship of the selected second electronic device.

3. The method of claim 2, wherein selecting, by the first electronic device, one of the plurality of second electronic devices comprises: selecting, by the first electronic device, a second electronic device according to a setting of the first electronic device; or selecting by the first electronic device a second electronic device selected by a user; or selecting by the first electronic device a second electronic device connected with the first electronic device and in operation.

4. The method of claim 1, wherein before the first electronic device determines the second button value corresponding to the button corresponding to the determined button according to the second correspondence relationship between the second button value and the determined button, the method further comprises:

obtaining, by the first electronic device, the second correspondence relationship from the second electronic device according to an identification parameter of the second electronic device.

5. The method of claim 1, wherein determining that the second electronic device connected with the first electronic device needs to be controlled by the remote controller of the first electronic device comprises:

determining, by the first electronic device, from the received signal that the second electronic device, connected with the first electronic device, needs to be controlled by the remote controller of the first electronic device; or determining, by the first electronic device, that the second electronic device, connected with the first electronic device, needs to be controlled by the remote controller of the first electronic device, after a user chooses via a user interface to switch a remote controller of the second electronic device.

6. A method for controlling a multi-device system, each device including a memory and one or more processors, each memory storing computer readable codes and the one or more processors configured to execute the computer readable codes, the method comprising:

receiving, by a second electronic device of the multi-device system, a second button value from a first electronic device of the multi-device system, wherein the first electronic device is a television set and the second electronic device is a set-top box, the second button value determined by the first electronic device determining from a first button value from a signal transmitted by a remote controller of the first electronic device, then instead of performing a first defined operation, the first electronic device determining a button of the remote controller corresponding to the first button value according to a first correspondence relationship between the first button value, and the first electronic device determining the second button value corresponding to the determined button according to a second correspondence relationship between the second button value and the determined button, wherein the second correspondence relationship is obtained by the first electronic device from the second electronic device, wherein the first button value is a first instruction code configured to control the first electronic device to perform the first defined operation and the second button value is a second instruction code configured to control the second electronic device to perform a second defined operation, wherein the second button value is different from the first button value; and performing, by the second electronic device, the second defined operation.

7. A first electronic device in a multi-device system the first electronic device comprising:

a transceiver;

one or more processors; and a memory storing therein one or more computer readable program codes, the one or more processors configured to execute the one or more computer readable program codes to:

control the transceiver to receive a control signal transmitted by a remote controller of the first electronic device;

determine a first value of the button corresponding to the control signal, wherein the first button value is a first instruction code configured to control the first electronic device to perform a first defined operation;

when the one or more processors determine that a second electronic device connected with the first electronic device is to be controlled by the remote controller of the first electronic device, wherein the first electronic device is a television set and the second electronic device is a set-top box, control the first electronic device to not perform the first defined operation and instead:

determine a button of the remote controller corresponding to the first button value according to a the first correspondence relationship between the first button value;

determine a second button value corresponding to the determined button according to a second correspondence relationship between the determined button and the second button value, wherein the second button value is a second instruction code configured to control a second electronic device in the multi-device system to perform a second defined operation indicated by the second instruction code, wherein the second correspondence relationship is obtained by the first electronic device from the second electronic device, and wherein the second button value is different from the first button value; and control the transceiver to transmit the second button value to the second electronic device.

8. The device of claim 7, wherein the one or more processors are further configured to execute the one or more computer readable program codes to determine from the received signal that the second electronic device, connected with the first electronic device, needs to be controlled by the remote controller of the first electronic device; or determine that the second electronic device, connected with the first electronic device, needs to be controlled by the remote controller of the first electronic device, after a user chooses via a user interface to switch a remote controller.

9. The device of claim 7, when the multi-device system comprises a plurality of second electronic devices, wherein the one or more processors are further configured to execute the one or more computer readable program codes to select one of the plurality of second electronic devices and determine the second button value corresponding to the determined button according to the second correspondence relationship of the selected second electronic device.

10. The device of claim 9, wherein the one or more processors are further configured to execute the one or more computer readable program codes to select a second electronic device selected by a user; or select a second electronic device connected with the first electronic device and in operation.

11. The device of claim 7, wherein before determining the second button value corresponding to the button corresponding to the determined button according to the second correspondence relationship between the second button value and the determined button, the one or more processors are further configured to execute the one or more computer readable program codes: to obtain the second correspondence relationship from the second electronic device according to an identification parameter of the second electronic device.

12. A second electronic device in a multi-device system the second electronic device comprising:

a receiver;

one or more processors; and a memory storing therein one or more computer readable program codes, the one or more processors configured to execute the one or more computer readable program codes to:

control the receiver to receive a second button value from a first electronic device of the multi-device system, wherein the first electronic device is a television set and the second electronic device is a set-top box, the second button value determined by the first electronic device determining a first button value from a signal transmitted by a remote controller of the first electronic device, then instead of performing a first defined operation, the first electronic device determining a button of the remote controller corresponding to the first button value according to a first correspondence relationship between the first button value and the determined button, and the first electronic device determining the second button value corresponding to the determined button according to a second correspondence relationship between the second button value and the determined button, wherein the second correspondence relationship is obtained by the first electronic device from the second electronic device, and wherein the second button value is different from the first button value, wherein the first button value is a first instruction code configured to control the first electronic device to perform the first defined operation and the second button value is a second instruction code configured to control the second electronic device to perform a second defined operation; and perform the second defined operation.

* * * * *